United States Patent
Deligne et al.

(10) Patent No.: US 7,181,395 B1
(45) Date of Patent: Feb. 20, 2007

(54) METHODS AND APPARATUS FOR AUTOMATIC GENERATION OF MULTIPLE PRONUNCIATIONS FROM ACOUSTIC DATA

(75) Inventors: Sabine V. Deligne, White Plains, NY (US); Ramesh Ambat Gopinath, Millwood, NY (US); Benoit Emmanuel Ghislain Maison, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 09/698,470

(22) Filed: Oct. 27, 2000

(51) Int. Cl.
*G10L 17/00* (2006.01)

(52) U.S. Cl. ............ 704/249; 231/240; 231/235; 231/236; 231/349; 231/257

(58) Field of Classification Search ........ 704/249, 704/231, 235, 243, 257, 236, 240
See application file for complete search history.

(56) References Cited

U.S. PATENT DOCUMENTS

| | | | | |
|---|---|---|---|---|
| 4,882,759 A | * | 11/1989 | Bahl et al. | 704/243 |
| 5,455,889 A | * | 10/1995 | Bahl et al. | 704/236 |
| 5,875,426 A | * | 2/1999 | Bahl et al. | 704/255 |
| 5,953,701 A | * | 9/1999 | Neti et al. | 704/254 |
| 6,076,053 A | * | 6/2000 | Juang et al. | 704/236 |
| 6,208,964 B1 | * | 3/2001 | Sabourin | 704/244 |
| 6,243,680 B1 | * | 6/2001 | Gupta et al. | 704/260 |
| 6,278,973 B1 | * | 8/2001 | Chung et al. | 704/257 |
| 6,347,295 B1 | * | 2/2002 | Vitale et al. | 704/209 |
| 6,728,674 B1 | * | 4/2004 | Griniasty | 704/256 |

OTHER PUBLICATIONS

Kwon et al., "Discriminative state-weighting of HMM-based speech recognitions", Circuits and Systems, IEEE Asia Pacific Conference, Nov. 18-21, 1996, pp. 251-254.*
B. Ramabhadran et al., "Acoustics-Only Based Automatic Phonetic Baseform Generation," ICASSP '98 Conference, pp. 1-4, 1998.
R.C. Rose et al., "Speech Recognition Using Automatically Derived Acoustic Baseforms," ICASSP '97 Conference, IEEE, pp. 1271-1274, 1997.

* cited by examiner

*Primary Examiner*—Richemond Dorvil
*Assistant Examiner*—Qi Han
(74) *Attorney, Agent, or Firm*—Anne V. Dougherty; Ryan, Mason & Lewis, LLP

(57) ABSTRACT

Methods and apparatus for automatically deriving multiple phonetic baseforms of a word from a speech utterance of this word are provided in accordance with the present invention. In one embodiment, a method of automatically generating two or more phonetic baseforms from a spoken utterance representing a word includes the steps of: transforming the spoken utterance into a stream of acoustic observations; generating two or more strings of subphone units, wherein each string of subphone units represents a string of subphone units substantially maximizing a log-likelihood of the stream of acoustic observations, and wherein the log-likelihood is computed as a weighted sum of a transition score associated with a transition model and of an acoustic score associated with an acoustic model; and converting the two or more strings of subphone units into two or more phonetic baseforms.

21 Claims, 3 Drawing Sheets

METHODS AND APPARATUS FOR AUTOMATIC GENERATION OF MULTIPLE PRONUNCIATIONS FROM ACOUSTIC DATA

FIELD OF THE INVENTION

The present invention generally relates to acoustic modeling of dynamic vocabularies for speech recognition and, more particularly, to acoustic modeling of out-of-vocabulary words which need to be added to a recognition lexicon, or of in-vocabulary words for which new pronunciation variants need to be added to a recognition lexicon.

BACKGROUND OF THE INVENTION

Speech recognition systems usually rely on a fixed lexicon of pronunciations written by a linguist. However, many applications require new words to be added to the vocabulary or new pronunciations of in-vocabulary words (i.e., words currently in the vocabulary of the speech recognition system, as compared to out-of-vocabulary words which are words not currently in the vocabulary of the system) to be added to the lexicon, hence the need for techniques which can automatically derive "phonetic baseforms." As is known, the pronunciation of a word is represented in the lexicon of a speech recognition system as a sequence of phones called a "phonetic baseform." This occurs, for example: (i) in dictation systems that allow personalized vocabularies; (ii) in name dialer applications, where the user enrolls the names he wants to dial; and (iii) in any application where actual pronunciations differ from canonic pronunciations (like for non-native speakers), so that the robustness of linguist-written pronunciations needs to be improved.

In situations where the speech recognition engine is embedded in a small device, there may not be any interface media, such as a keyboard, to allow the user to enter the spelling of the words he wants to add in his/her personalized vocabulary. And even if such interface were to be available, the spellings may not be of very much help as these applications typically involve words the pronunciation of which is highly unpredictable, like proper names for example. In this context, it is difficult to use a priori knowledge, such as letter-to-sound rules in a reliable way. Consequently, the user is asked to utter once or twice the words he wants to add to his/her personalized vocabulary, and phonetic baseforms for these words are derived from the acoustic evidence provided by the user's utterances. These approaches usually rely on the combined use of: (i) an existing set of acoustic models of subphone units (a subphone unit is a fraction of a phone); and (ii) a model of transition between these subphone units (in the following, we refer to such model as a model of transition between subphone units).

The way to optimally combine these models is an open issue as it is not known in advance which of the models can most reliably describe the acoustic evidence observed for each new word to enroll. For example, when the enrolled words are proper names, the reliability of the model of transition between the subphones is questionable, since proper names do not follow strict phonotactic rules. On the other hand, for common words pronounced in a noisy environment, the model of transition between the phones may turn out to be more reliable than the acoustic models. Current implementations of automatic baseform generation do not take into consideration the relative degree of confidence that should be put into either component.

SUMMARY OF THE INVENTION

The present invention provides methods and apparatus for automatically deriving multiple phonetic baseforms of a word from a speech utterance of this word. The present invention addresses the issue of generating phonetic baseforms from acoustic evidence in a way that makes the best possible use of the available a priori knowledge, where the a priori knowledge comprises a statistical model of transitions between subphones units and acoustic models of subphone units.

In one illustrative aspect of the invention, a method of automatically generating two or more phonetic baseforms from a spoken utterance representing a word comprises the following steps. First, the spoken utterance is transformed into a stream of acoustic observations. Next, two or more strings of subphone units are generated, wherein each string of subphone units represents a string of subphone units substantially maximizing a log-likelihood of the stream of acoustic observations, and wherein the log-likelihood is computed as a weighted sum of a transition score associated with a transition model and of an acoustic score associated with an acoustic model. The two or more strings of subphone units are then converted into two or more phonetic baseforms. The two or more phonetic baseforms may then be added to a recognition lexicon associated with a speech recognition system.

It is to be appreciated that the word associated with the spoken utterance may be a word not currently in a vocabulary of the speech recognition system, or the word may be a word currently in a vocabulary of the speech recognition system but for which pronunciation variants are desired to be added to the recognition lexicon. The stream of acoustic observations is preferably a stream of feature vectors. The weighted sum may include weights respectively of w and (1−w), wherein each value of w defines a distinct log-likelihood function which reaches its maximum value for possibly distinct strings of subphone units. Also, each value of w is preferably chosen between 0 and 1. Further, in one embodiment, the converting step may comprise, for each string of subphone units, the steps of replacing the subphone units with corresponding phones, and merging together repeated phones.

In another illustrative aspect of the invention, a computing device having a speech recognition engine comprises apparatus for automatically generating two or more phonetic baseforms from a spoken utterance representing a word. The apparatus is operative to: (i) transform the spoken utterance into a stream of acoustic observations; (ii) generate two or more strings of subphone units, wherein each string of subphone units represents a string of subphone units substantially maximizing a log-likelihood of the stream of acoustic observations, and wherein the log-likelihood is computed as a weighted sum of a transition score associated with a transition model and of an acoustic score associated with an acoustic model; (iii) convert the two or more strings of subphone units into two or more phonetic baseforms; (iv) add the two or more phonetic baseforms to a recognition lexicon associated with the speech recognition engine.

Advantageously, in accordance with the invention, multiple phonetic baseforms of a word may be automatically derived from a speech utterance of this word in a computing device running a speech recognition system which does not have provisions, e.g., a keyboard, for typing in new phonetic baseforms. Thus, by employing the methodologies of the invention, such multiple phonetic baseforms of a word are automatically derived from captured spoken utterances and may then be added to the lexicon associated with the speech recognition system.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative speech recognition system. However, it is to be understood that the present invention is not limited to this or any particular speech recognition system. Rather, the invention is more generally applicable to any suitable speech recognition system in which it is desirable to realize improved acoustic modeling of out-of-vocabulary words which need to be added to a recognition lexicon and/or improved acoustic modeling of in-vocabulary words for which new pronunciation variants need to be added to a recognition lexicon. By way of example only, generalized speech recognition systems such as the commercially available large vocabulary IBM ViaVoice, ViaVoice Gold or Millennium Embedded systems (trademarks of IBM Corporation of Armonk, N.Y.) may be adapted to permit and/or perform automatic phonetic baseform generation in accordance with the invention.

Figure 1:
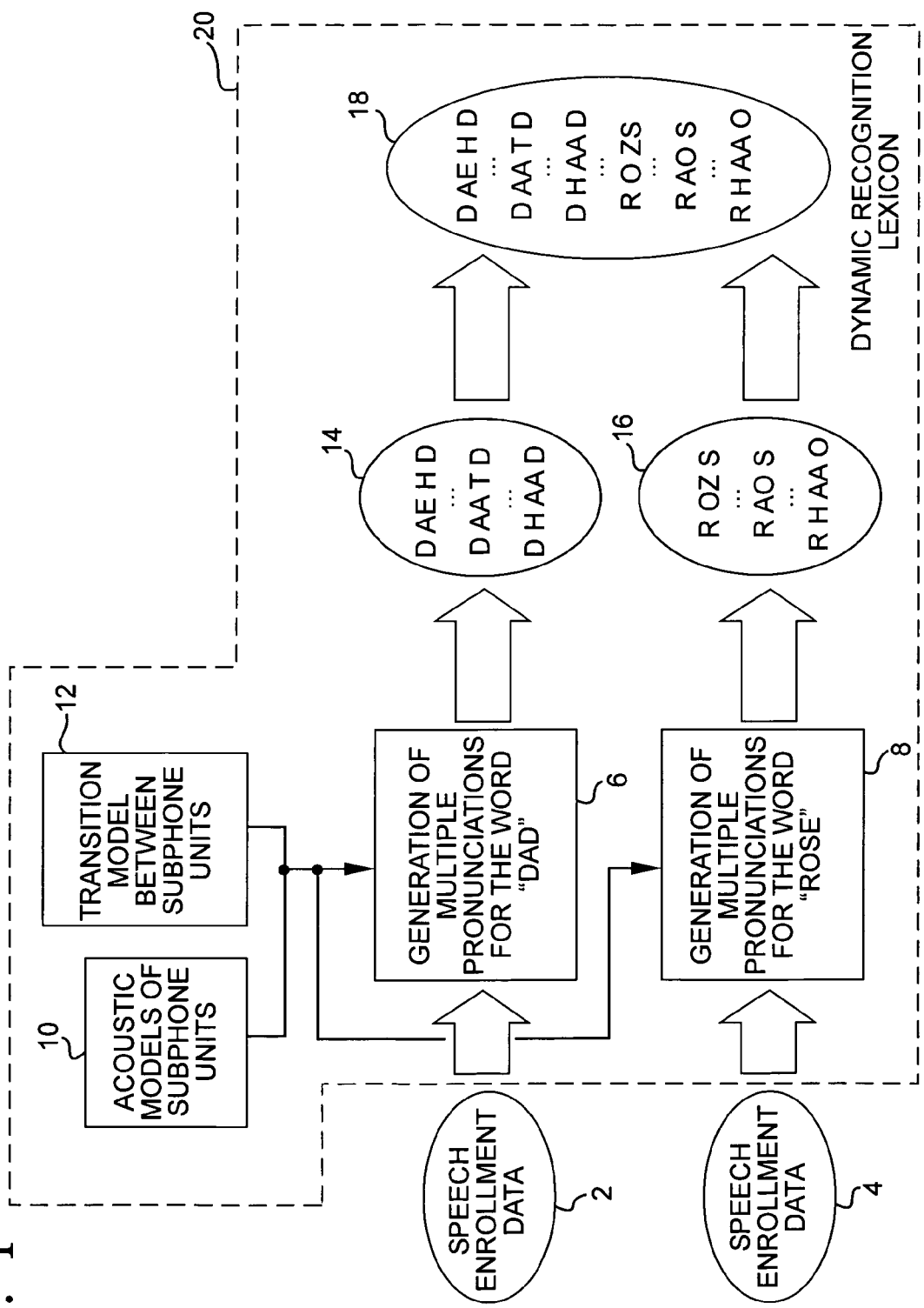
FIG. 1 is a block diagram of a speech recognition system with a dynamic recognition lexicon obtained by automatically generating multiple phonetic baseforms according to an embodiment of the present invention.

FIG. 1 illustrates a speech recognition system 20 with a dynamic recognition lexicon 18 obtained by automatically generating multiple phonetic baseforms in accordance with the present invention. A user of the speech recognition system 20 utters words to be enrolled in the lexicon of the speech recognition system. For example, this may include out-of-vocabulary words which need to be added to the recognition lexicon, or in-vocabulary words for which new pronunciation variants need to be added to the recognition lexicon. As illustrated in FIG. 1, the user provides speech enrollment data 2 by uttering the word "DAD," and speech enrollment data 4 by uttering the word "ROSE." For each word to enroll in the recognition vocabulary, multiple phonetic baseforms are derived in accordance with the present invention from the speech utterance of that word. This is accomplished in blocks 6 and 8 which represent a multiple phonetic baseform generation module. As will be explained, the derivation process relies on the combined use of acoustic models of subphone units 10, and of a model of transitions between subphone units 12. All distinct phonetic baseforms derived from the utterance of a word are added to the recognition lexicon 18 as possible pronunciations of that word.

Thus, as generally illustrated in FIG. 1, multiple phonetic baseforms representing multiple pronunciations for the word "DAD" are generated according to the invention in block 6, e.g., "D AE H D," "D AA T D" and "D H AA D." Likewise, multiple phonetic baseforms representing multiple pronunciations for the word "ROSE" are generated according to the invention in block 8, e.g., "R O Z S," "R AO S" and "R H AA O." Of course, more or less phonetic baseforms may be generated depending on the word or sound being enrolled. Each pronunciation becomes part of the dynamic recognition lexicon 18 of the speech recognition system 20, which may be used in accordance with the acoustic models to recognize real-time spoken utterances, as is well known in the art.

Figure 2:
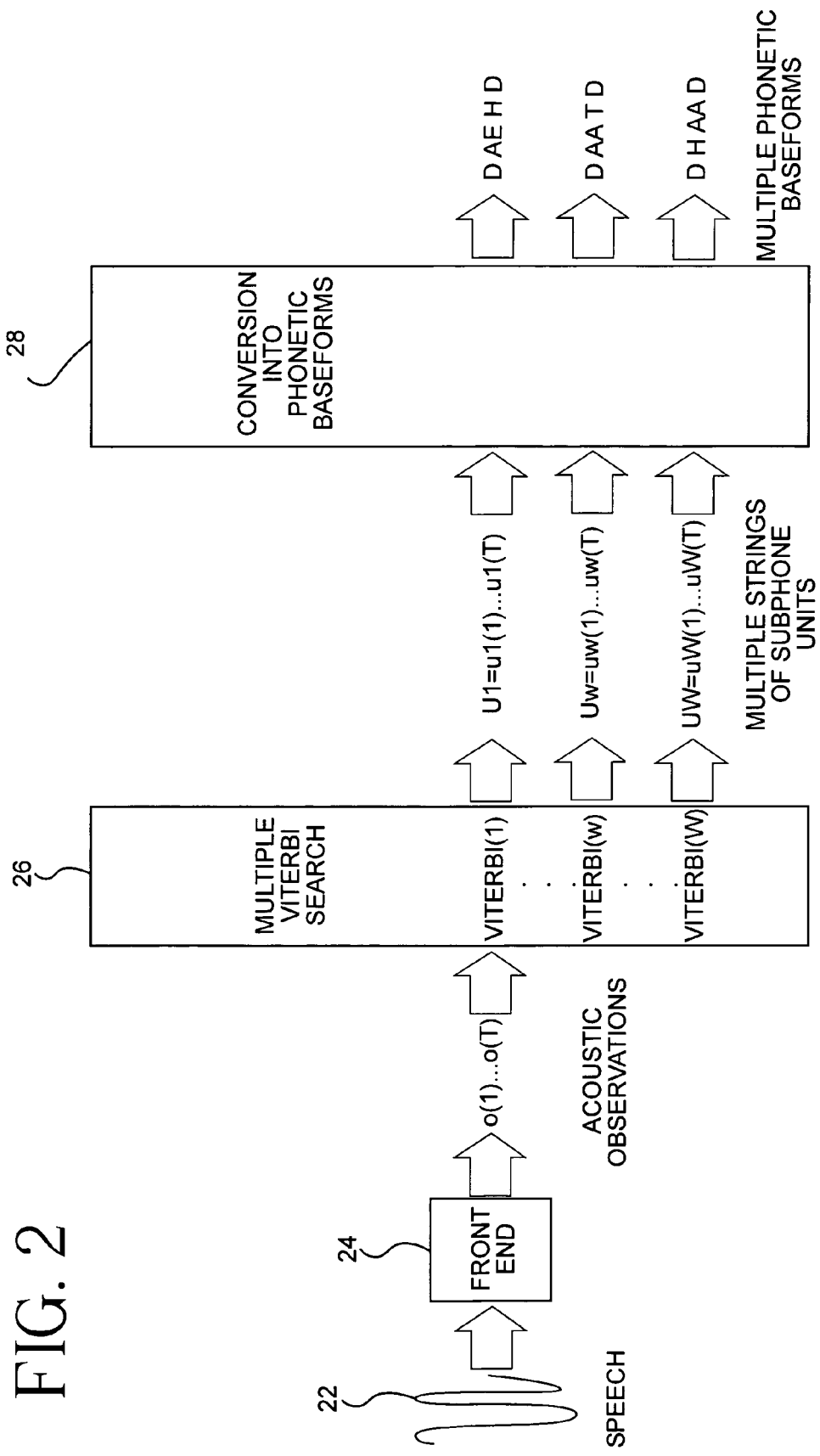
FIG. 2 is a block diagram illustrating a procedure to automatically derive multiple phonetic baseforms from an enrollment speech utterance according to an embodiment of the present invention.

FIG. 2 illustrates a procedure to automatically derive multiple phonetic baseforms from a speech utterance of a word. It is to be understood that the procedure illustrated in FIG. 2 is the procedure performed in accordance with blocks 6 and 8 of FIG. 1, i.e., the process performed by a multiple phonetic baseform generation module.

The front end block 24 in FIG. 2 refers to the process that transforms an input speech waveform (e.g., speech enrollment data 2 or 4 in FIG. 1) into a stream of T feature vectors o(1) . . . o(T) called the acoustic observations. The operations of the "front end" of a speech recognition system are well known in the art. The front end generally receives speech data and generates representative feature vectors therefrom. This is accomplished in accordance with an audio-to-analog transducer (microphone) and an analog-to-digital converter which respectively transduce the utterances into an electrical signal and then convert the electrical signal into a digital signal representative of the speech uttered. The front end block may sample the speech signal and partition the signal into overlapping frames so that each frame may be discretely processed. The sampled speech signal is typically recorded and provided to a feature extractor. The feature extractor receives the speech signal and, as is known in the art, extracts cepstral features from the signal at regular intervals, for example, about every 10 milliseconds. The cepstral features are in the form of feature or speech vectors (signals). While the above description gives an example of the operations that may be performed by a front end block, it is to be understood that the invention is not limited to any particular acoustic observation generating techniques.

The multiple Viterbi search block 26 in FIG. 2 inputs a stream of acoustic observations from the front end 24 and outputs V strings of subphone units {U1, . . . Uv, . . . UV), where each string Uv is composed of T subphone units u(1) . . . u(T). Each string Uv corresponds to the string of subphone units maximizing the log-likelihood of the input stream of acoustic observations, where the log-likelihood is computed as the weighted sum of a transition score (associated with the transition model 12 of FIG. 1) and of an acoustic score (associated with an acoustic model 10 of FIG. 1), with weights respectively of w and (1−w). Each value of "w," chosen between 0 and 1, thus defines a distinct log-likelihood function which reaches its maximum value for possibly distinct strings of subphone units. In conventional approaches, a single baseform is derived by maximizing the sum of the log-likelihoods given by the acoustic models and by the transition model. This would be equivalent to setting "w" to the single value 0.5 in the approach of the present invention.

Lastly, the phonetic baseform conversion block 28 in FIG. 2 inputs the strings of subphone units from the Viterbi search block 26 and converts them into a set of distinct phonetic baseforms. These distinct phonetic baseforms are added to the recognition lexicon 18.

It is to be understood that the most likely string of subphone units u*(1) . . . u*(T) matching the input stream of acoustic observations for a given weight value w is retrieved with a Viterbi algorithm employed in block 26 (where * may denote 1, . . . , V):

$$u^*(1) \ldots u^*(T) = \operatorname{argmax}[(1-w)^* \times \log P(o(1) \ldots o(T) | u(1) \ldots u(T)) + w^* \times \log P(u(1) \ldots u(T))]$$

The log-likelihood log P(u(1) . . . u(T)) in equation (1) is computed with a bigram model of transition between the subphone units:

$$\log P(u(1) \ldots u(T)) = \sum_{t=2}^{T} \log P(u(t) | u(t-1)) + \log P(u(1))$$

The acoustic log-likelihood log P(o(1) . . . o(T)|u(1) . . . u(T)) in equation (1) is computed as the log-likelihood of each acoustic observation o(t) given the acoustic model characterizing the subphone unit u(t):

$$\log P(o(1) \ldots o(T) | u(1) \ldots u(T)) = \sum_{t=1}^{T} \log P(o(t) | u(t))$$

The string u*(1) . . . u*(T) maximizing equation (1) is retrieved with a Viterbi algorithm employed in block 26 which comprises a forward pass and of a backtracking procedure, as follows:

Forward Pass:

Set logscore(0, ui) equal to 0 for each unit ui.

For t=1 to T
   For each subphone unit uj
   find the subphone ui* maximizing the quantity:
   logscore(t−1, ui)+w* log P(uj|ui) over the set of all possible units ui.
   set the predecessor of uj at t−1 to be ui*: pred(uj, t−1)=ui*
   set logscore(t, uj) to:
   logscore(t−1, ui*)+w* log P(uj|ui*)+(1−w)* log P(o(t)|uj)

Backtracking Procedure:

The most likely string of subphone units u*(1) . . . u*(T), given the weight value w, is retrieved as follows:
   set u*(T) equal to the subphone unit for which logscore(T, u) reaches it maximum value.
   For t=T to 2
   Set u*(t−1) equal to pred(u*(t), t−1)

The resulting string of subphone units u*(1) . . . u*(T) is converted into a phonetic baseform by replacing the subphone units with their phone counterpart and merging together repeated phones. Such replacement and merging operations are performed in block 28.

A general illustrative overview of the inventive multiple phonetic baseform generation algorithm described above is now given:

(1) Define a discrete set of values V={v1; v2; v3; . . . }, all comprised in the interval [0; 1].

(2) For a given utterance of a word to enroll,
For each value v in V
find the most likely alignment of sub-phone units [u(1) . . . u(T)]* given the value of w, with a Viterbi search,
convert [u(1) . . . u(T)]* into a phonetic baseform bsf,
if the baseform bsf is not already in the recognition lexicon, add it to the recognition lexicon as a possible pronunciation of the word to enroll.

In a task where it is inherently difficult to evaluate how accurate each of the models can perform, the generation of multiple phonetic baseforms by varying the relative weights assigned to the models according to the invention allows to compensate for a possible mismatch.

Here we describe the acoustic models, the transition model and the weight values for a preferred embodiment of use:

(a) Acoustic model characterizing the subphone units: For preferred performance, the acoustic model of the subphone units should preferably be context-dependent, i.e., each acoustic model describes a subphone unit in a given phonetic context.

(b) Transition model: The transition model is estimated off-line by aligning a large dataset of speech with a known transcription on the acoustic models of the subphone units, and by collecting bigram transition counts between the acoustic models in the alignment. This way, both the duration of the subphone units and the transition between the subphone units are modeled.

(c) Weight values: For preferred performance, the weight values "w" should preferably be taken in the set {0.1; 0.2; 0.3; 0.4; 0.5; 0.6; 0.7}. For higher values of w, the baseforms derived for distinct words may tend to become similar, hence, an increased confusability across the items in the recognition lexicon and a degradation of the recognition accuracy.

Figures 3, 4A, 4B:
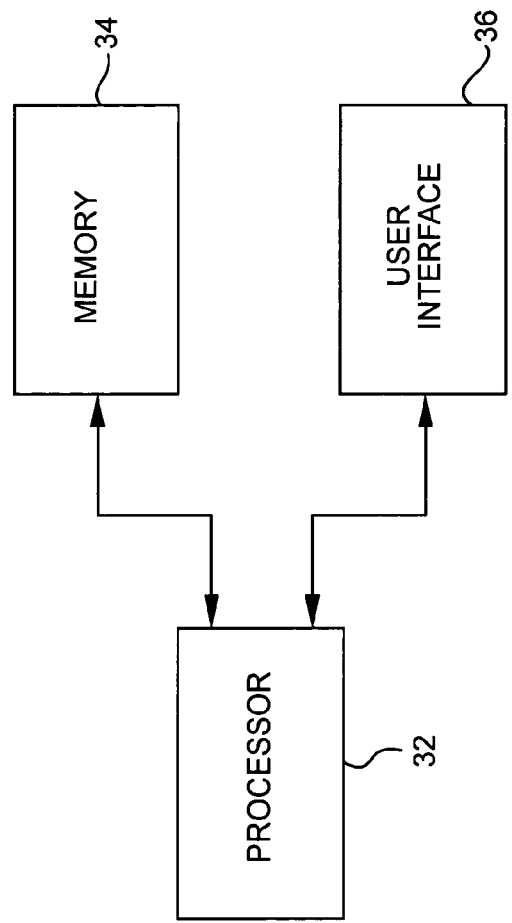
FIG. 3 is a block diagram of an illustrative hardware implementation of an automatic multiple phonetic baseform generation system according to one embodiment of the present invention.
FIGS. 4A and 4B illustrate tabular results associated with an evaluation between an automatic multiple phonetic baseform generation methodology of the present invention and an existing phonetic baseform generation methodology.

Referring now to FIG. 3, a block diagram of an illustrative hardware implementation of a speech recognition system employing automatic multiple phonetic baseform generation according to the invention (e.g., as illustrated in FIGS. 1 and 2) is shown. In this particular implementation, a processor 32 for controlling and performing automatic multiple phonetic baseform generation is coupled to a memory 34 and a user interface 36. It is to be appreciated that the term "processor" as used herein is intended to include any processing device, such as, for example, one that includes a CPU (central processing unit) and/or other suitable processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "user interface" as used herein is intended to include, for example, a microphone for inputting speech data to the processing unit and preferably an audio speaker for outputting speech (e.g., synthesized speech data) and/or other data associated with the processing unit.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIGS. 1 and 2 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

In the following section, we present a comparative evaluation of the automatic multiple phonetic baseform generation methodology of the invention. The methodology of the invention with multiple pronunciations is evaluated against a conventional technique where a single pronunciation is derived from a speech utterance.

We first explain the evaluation protocol and then we compare the recognition scores obtained with the invention and with the conventional technique.

Evaluation Protocol

Our experiments include deriving pronunciations for a set of words, and using the lexicon formed in accordance with the automatically generated pronunciations in speech recognition tests.

Enrollment Data

We report on experiments with two different sets of enrolled words:

the enrollment set E1 consists of 50 distinct words, each word is repeated twice by 10 speakers in a quiet environment;

the enrollment set E2 consists of 35 distinct words, each word is repeated once by 20 speakers in a quiet environment.

Baseform Generation

Baseforms are automatically generated using a standard IBM set of speaker independent acoustic models (156 subphones covering the phonetics of English, and modeled depending on the phonetic context in which they occur by a total of about 9,000 gaussians), and an existing set of transition probabilities between the 156 subphone units.

Procedure P1: as per the methodology of the invention described above, multiple baseforms are derived by using the weight values 0.1, 0.2, 0.3, 0.4, 0.5, 0.6, and 0.7

Procedure P2: to represent the conventional procedure, a single weight value of 0.5 is used to generate a single baseform for each speech utterance.

Recognition Lexicons

Recognition lexicons generically denoted as LEX_E1_P1 (corresponding to procedure P1 of the invention) and recognition lexicons LEX_E1_P2 (corresponding to conventional procedure P2) are formed for each of the 10 speakers in the enrollment set E1, by gathering the distinct baseforms generated by following respectively procedure P1 and P2.

Recognition lexicons generically denoted as LEX_E2_P1 (corresponding to procedure P1 of the invention) and recognition lexicons LEX_E2_P2 (corresponding to conventional procedure P2) are formed for each of the 20 speakers in the enrollment set E2, by gathering the distinct baseforms generated by following respectively procedures P1 and P2.

Test Data

The recognition lexicons derived from the enrollment set E1 using either procedure P1 or P2 (LEX_E1_P1 and LEX_E1_P2) are evaluated on 2 test sets:

test set T1.1: each of the 50 words from E1 are repeated 10 times test set T1.2: each of the 50 words from E1 are repeated 10 times in different short sentences (typically command sentences like "ADD <Name> TO THE LIST," where <Name> is an enrolled word) by each of the speakers in E1.

The recognition lexicons derived from the enrollment set E2 using either procedure P1 or P2 (LEX_E2_P1 and LEX_E2_P2) are evaluated on 3 test sets:

test set T2.1: is recorded in a quiet environment;

test set T2.2: is recorded in a car at 30 miles/hour;

test set T2.3: is recorded in a car at 60 miles/hour.

All 3 test sets consist of the 35 words from E2 uttered once (the enrolled word is preceded by either the word "CALL," "EMAIL," or "DIAL") by each of the speakers in E2.

The baseforms of the words which are not enrolled words in test set T1.2, T2.1, T2.2 and T2.3 are linguist-written baseforms.

Recognition Scores

The word error rate WER is computed as:

$$WER = (n_{sub} + n_{del} + n_{ins})/(n_{corr}) * 100$$

where $n_{corr}$ is the number of words in the correct transcription of the utterance, and where $n_{sub}$, $n_{del}$ and $n_{ins}$ are respectively the number of substitutions, deletions and insertions in the decoded utterance. For each test, the WER shown is an averaged WER computed over all the speakers in the test set. FIG. 4A shows the comparative results associated with test sets T1.1 and T1.2. FIG. 4B shows the comparative results associated with test sets T2.1, T2.2 and T2.3.

On all the test sets, using the methodology of the invention allows to significantly reduce the word error rate as compared to the conventional baseform generation technique. The relative reduction of the WER on each test set is: T1.1: 41%; T1.2: 9%; T2.1: 25%; T2.2: 32% and T3.3: 20%.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of automatically generating two or more phonetic baseforms from a spoken utterance representing a word, the method comprising the steps of:

transforming the spoken utterance into a stream of acoustic observations;

generating two or more strings of subphone units, wherein each string of subphone units represents a string of subphone units substantially maximizing a log-likelihood of the stream of acoustic observations, and wherein the log-likelihood is computed as a weighted sum of a transition score associated with a transition model between the subphone units and of an acoustic score associated with a separate context-dependent acoustic model of the subphone units; and converting the two or more strings of subphone units into two or more phonetic baseforms.

2. The method of claim 1, further comprising the step of adding the two or more phonetic baseforms to a recognition lexicon associated with a speech recognition system.

3. The method of claim 2, wherein the word is a word not currently in a vocabulary of the speech recognition system.

4. The method of claim 2, wherein the word is a word currently in a vocabulary of the speech recognition system but for which pronunciation variants are desired to be added to the recognition lexicon.

5. The method of claim 1, wherein the stream of acoustic observations includes a stream of feature vectors.

6. The method of claim 1, wherein the weighted sum includes weights respectively of w and (1−w), wherein each value of w defines a distinct log-likelihood function which reaches its maximum value for possibly distinct strings of subphone units.

7. The method of claim 6, wherein each value of w is chosen between 0 and 1.

8. The method of claim 1, wherein the converting step comprises, for each string of subphone units:

replacing the subphone units with corresponding phones; and merging together repeated phones.

9. Apparatus for automatically generating two or more phonetic baseforms from a spoken utterance representing a word, the apparatus comprising:

at least one processor operative to: (i) transform the spoken utterance into a stream of acoustic observations; (ii) generate two or more strings of subphone units, wherein each string of subphone units represents a string of subphone units substantially maximizing a log-likelihood of the stream of acoustic observations, and wherein the log-likelihood is computed as a weighted sum of transition score associated with a transition model between the subphone units and of an acoustic score associated with a separate context-dependent acoustic model of the subphone units; and (iii) convert the two or more strings of subphone units into two or more phonetic baseforms.

10. The apparatus of claim 9, wherein the at least one processor is further operative to add the two or more phonetic baseforms to a recognition lexicon associated with a speech recognition system.

11. The apparatus of claim 10, wherein the word is a word not currently in a vocabulary of the speech recognition system.

12. The apparatus of claim 10, wherein the word is a word currently in a vocabulary of the speech recognition system but for which pronunciation variants are desired to be added to the recognition lexicon.

13. The apparatus of claim 9, wherein the stream of acoustic observations includes a stream of feature vectors.

14. The apparatus of claim 9, wherein the weighted sum includes weights respectively of w and (1−w), wherein each value of w defines a distinct log-likelihood function which reaches its maximum value for possibly distinct strings of subphone units.

15. The apparatus of claim 14, wherein each value of w is chosen between 0 and 1.

16. The apparatus of claim 9, wherein the converting operation comprises, for each string of subphone units, the operations of replacing the subphone units with corresponding phones, and merging together repeated phones.

17. An article of manufacture for automatically generating two or more phonetic baseforms from a spoken utterance representing a word, comprising a machine readable medium containing one or more programs which when executed implement the steps of:

transforming the spoken utterance into a stream of acoustic observations;

generating two or more strings of subphone units, wherein each string of subphone units represents a string of subphone units substantially maximizing a log-likelihood of the stream of acoustic observations, and wherein the log-likelihood is computed as a weighted sum of a transition score associated with a transition model between the subphone units and of an acoustic score associated with a separate context-dependent acoustic model of the subphone units; and converting the two or more strings of subphone units into two or more phonetic baseforms.

18. The article of claim 17, further comprising the step of adding the two or more phonetic baseforms to a recognition lexicon associated with a speech recognition system.

19. The article of claim 18, wherein the word is a word not currently in a vocabulary of the speech recognition system.

20. The article of claim 18, wherein the word is a word currently in a vocabulary of the speech recognition system but for which pronunciation variants are desired to be added to the recognition lexicon.

21. A computing device having a speech recognition engine comprising apparatus for automatically generating two or more phonetic baseforms from a spoken utterance representing a word, the apparatus operative to: (i) transform the spoken utterance into a stream of acoustic observations; (ii) generate two or more strings of subphone units, wherein each string of subphone units represents a string of subphone units substantially maximizing a log-likelihood of the stream of acoustic observations, and wherein the log-likelihood is computed as a weighted sum of a transition score associated with a transition model between the subphone units and of an acoustic score associated with a separate context-dependent acoustic model of the subphone units; (iii) convert the two or more strings of subphone units into two or more phonetic baseforms; (iv) add the two or more phonetic baseforms to a recognition lexicon associated with the speech recognition engine.

* * * * *